(12) United States Patent
Kim et al.

(10) Patent No.: US 9,877,606 B2
(45) Date of Patent: Jan. 30, 2018

(54) TEA INFUSER

(71) Applicant: DESIGNX2 CO., LTD., Busan (KR)

(72) Inventors: Gwang Kim, Busan (KR); Sung Won Yoo, Busan (KR); Dong Ok Ha, Busan (KR)

( * ) Notice: Subject to any disclaimer, the term of this patent is extended or adjusted under 35 U.S.C. 154(b) by 300 days.

(21) Appl. No.: 14/682,102

(22) Filed: Apr. 9, 2015

(65) Prior Publication Data

US 2016/0296057 A1    Oct. 13, 2016

(51) Int. Cl.
*A47J 31/00*    (2006.01)

(52) U.S. Cl.
CPC .................................. *A47J 31/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,919,365 A * | 7/1999 | Collette | ................. | A45F 3/20 210/419 |
| 2005/0284303 A1* | 12/2005 | Zell | ................. | A47J 31/005 99/279 |
| 2008/0282900 A1* | 11/2008 | Huang | ................. | A47J 31/005 99/322 |
| 2009/0145839 A1* | 6/2009 | Miga, Jr. | ................. | C02F 1/002 210/466 |
| 2009/0178573 A1* | 7/2009 | Pan | ................. | A47J 31/005 99/323 |
| 2010/0263549 A1* | 10/2010 | Lee | ................. | A47J 31/18 99/319 |
| 2011/0226133 A1* | 9/2011 | Shen | ................. | A47J 31/005 99/316 |
| 2012/0012008 A1* | 1/2012 | Kwok | ................. | A47J 31/0615 99/297 |
| 2012/0225175 A1* | 9/2012 | Lown | ................. | A47J 31/06 426/435 |
| 2013/0139703 A1* | 6/2013 | Hogarth | ................. | A47J 31/005 99/323 |
| 2013/0248536 A1* | 9/2013 | Prum | ................. | A47J 43/27 220/568 |
| 2014/0251152 A1* | 9/2014 | Tien | ................. | A47J 31/0636 99/322 |
| 2014/0251153 A1* | 9/2014 | Tien | ................. | A47J 31/0636 99/322 |

FOREIGN PATENT DOCUMENTS

KR    20-0458422    2/2012

OTHER PUBLICATIONS

English Specification of 20-0458422.

\* cited by examiner

*Primary Examiner* — Anne M Antonucci
*Assistant Examiner* — Renee M Larose
(74) *Attorney, Agent, or Firm* — Antonio Ha & U.S. Patent, LLC

(57) ABSTRACT

According to an embodiment of the present invention, a tea infuser comprises a hollow body substantially shaped as a truncated cone. The body includes an upper part having an internal thread. A container is threaded into the body through the upper part. A lower part has an external thread. A filter is disposed in the body. The filter has a jaw along an outer circumferential surface thereof. A first cap covers the upper part. A second cap is threaded to the lower part.

4 Claims, 5 Drawing Sheets

TEA INFUSER

TECHNICAL FIELD

Embodiments of the present invention concern a tea infuser, and more specifically, to a tea infuser that may be used in various types of bottles (e.g., PET bottles).

DISCUSSION OF RELATED ART

As the recognition that tea is good for heath spreads, the demand of tea is sharply increasing. However, tea brewing is an annoying process requiring a few steps using a so-called tea infuser, and existing tea infusers, mostly designed for home use only, are too bulky in size, deterring consumers desiring to enjoy tea outdoor. Bottled or canned tea easily available in super markets or so might respond to such needs, but cannot satisfy the consumers who favor brewed tea. Also, existing portable tea infusers need come with a separate cup and container for containing water, and are not a good choice in light of convenience of use.

Therefore, a need exists for a tea infuser that allows for tea brewing or making outdoors in a simplified manner.

SUMMARY

According to an embodiment of the present invention, a tea infuser comprises a body widening downwards. The body includes a first opening part at an upper side thereof. The first opening part has an opening for insertion and coupling of a neck of a bottle. The first opening has an internal thread along an inner circumferential surface thereof to allow the neck of the bottle to be threaded into the first opening part. The body includes an internal space and a second opening part. The second opening is formed at a lower side of the body. The second opening part has an external thread along an outer circumferential surface thereof. A filter is substantially shaped as a cylinder. The filter is inserted and coupled with the body through the second opening part and projects beyond the first opening part. The filter has a hollow in a middle thereof and multiple pores in side and top surfaces thereof. A cover is press-fitted into the body and stuck by a coupling step formed along an upper periphery of the body. The cover covers the filter to block inflow of foreign substances. A lower cap is coupled with the second opening part of the body to seal the second opening part and supporting the body.

The first opening part may be smaller in size than the internal space of the body.

A ring-shaped upper jaw may be formed between the internal space and the first opening part to fasten a lower part of the filter.

An annular jaw may be formed on a lower part of the filter to tightly contact the upper jaw.

An upper ring may be inserted in the first opening part to tightly contact an outer surface of the filter and may be positioned opposite the annular jaw of the filter to pressingly support the upper jaw of the body and fasten the filter.

A fixing member may be inserted in the internal space of the body to tightly contact an inner circumferential surface of the internal space and may support the annular jaw of the filter. The fixing member may have a through hole through which the filter passes.

An O-shaped ring may be coupled to the lower cap and may air-tightly contact the second opening part of the body.

According to an embodiment of the present invention, a tea infuser comprises a hollow body substantially shaped as a truncated cone. The body includes an upper part having an internal thread. A container, such as, e.g., a PET bottle, is threaded into the body through the upper part. A lower part has an external thread. A filter is disposed in the body. The filter has a jaw along an outer circumferential surface thereof. A first cap covers the upper part. A second cap is threaded to the lower part.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EMBODIMENTS

Figure 1:
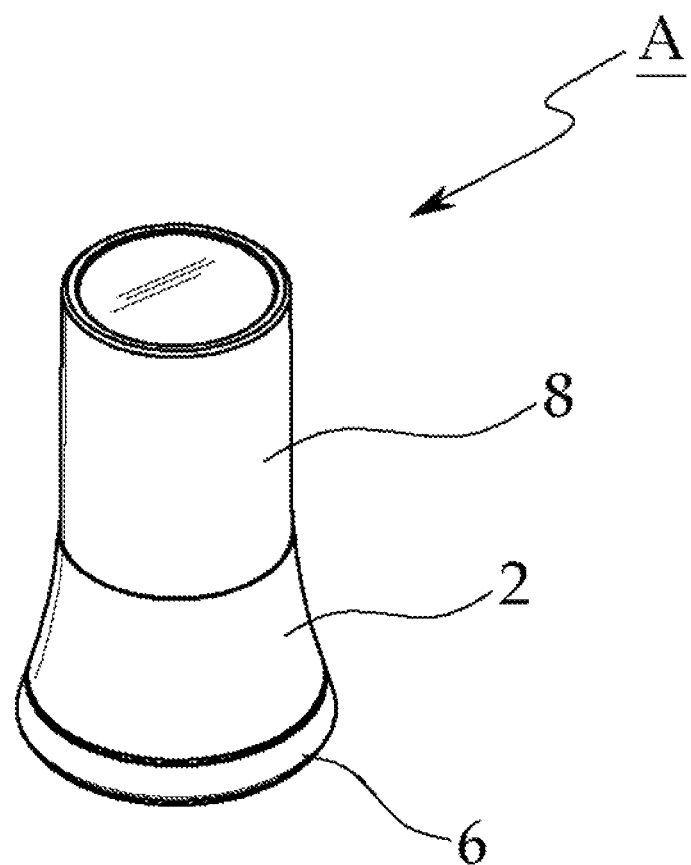
FIG. 1 is a perspective view illustrating a tea infuser according to an embodiment of the present invention.

Hereinafter, exemplary embodiments of the inventive concept will be described in detail with reference to the accompanying drawings. The inventive concept, however, may be modified in various different ways, and should not be construed as limited to the embodiments set forth herein. As used herein, the singular forms "a," "an," and "the" are intended to include the plural forms as well, unless the context clearly indicates otherwise. It will be understood that when an element or layer is referred to as being "on" or "coupled to" another element or layer, it can be directly on or coupled to the other element or layer, or intervening elements or layers may be present.

The size or shape of each element in the drawings may be exaggerated for clarity and ease of description, and the terms used herein may be replaced with other terms depending on the user's or operator's intention or practice, and such terms should be interpreted throughout the specification and the drawings.

Figure 2:
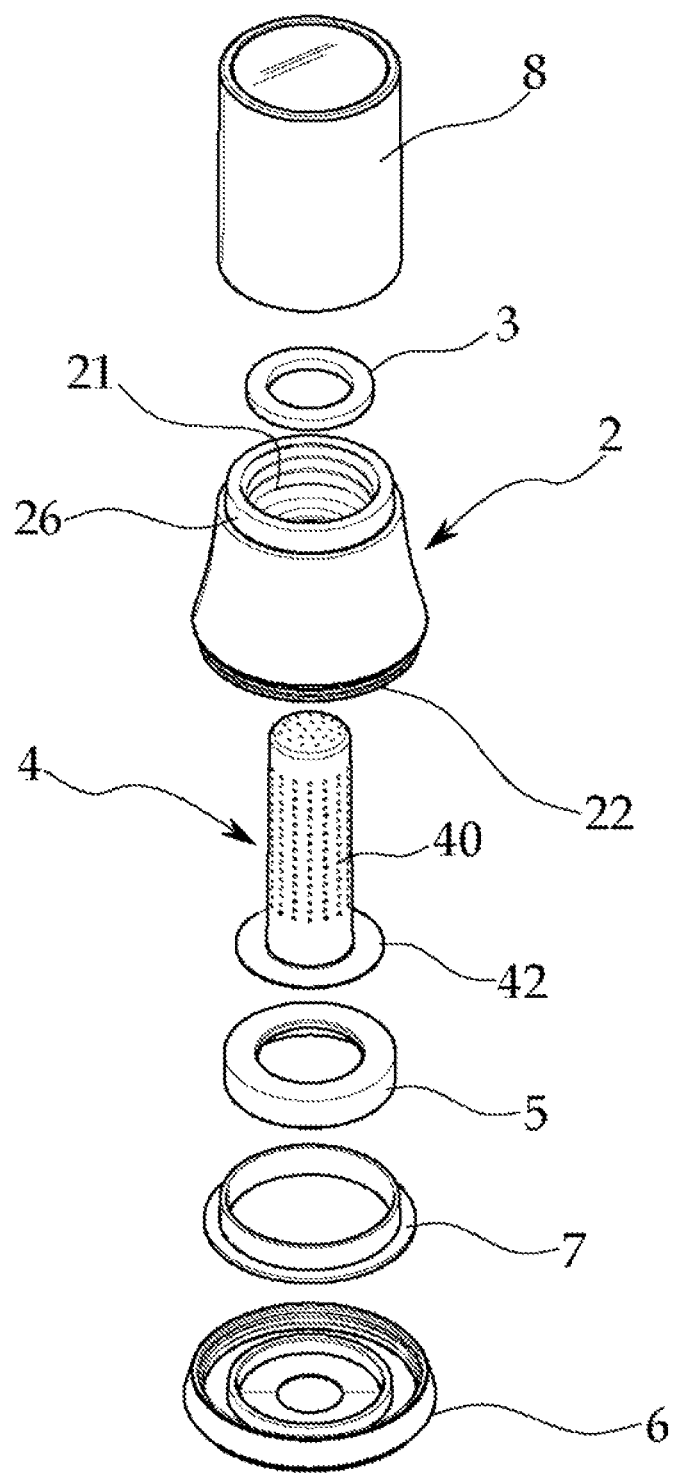
FIG. 2 is an exploded perspective view illustrating a tea infuser according to an embodiment of the present invention.
Figure 3:
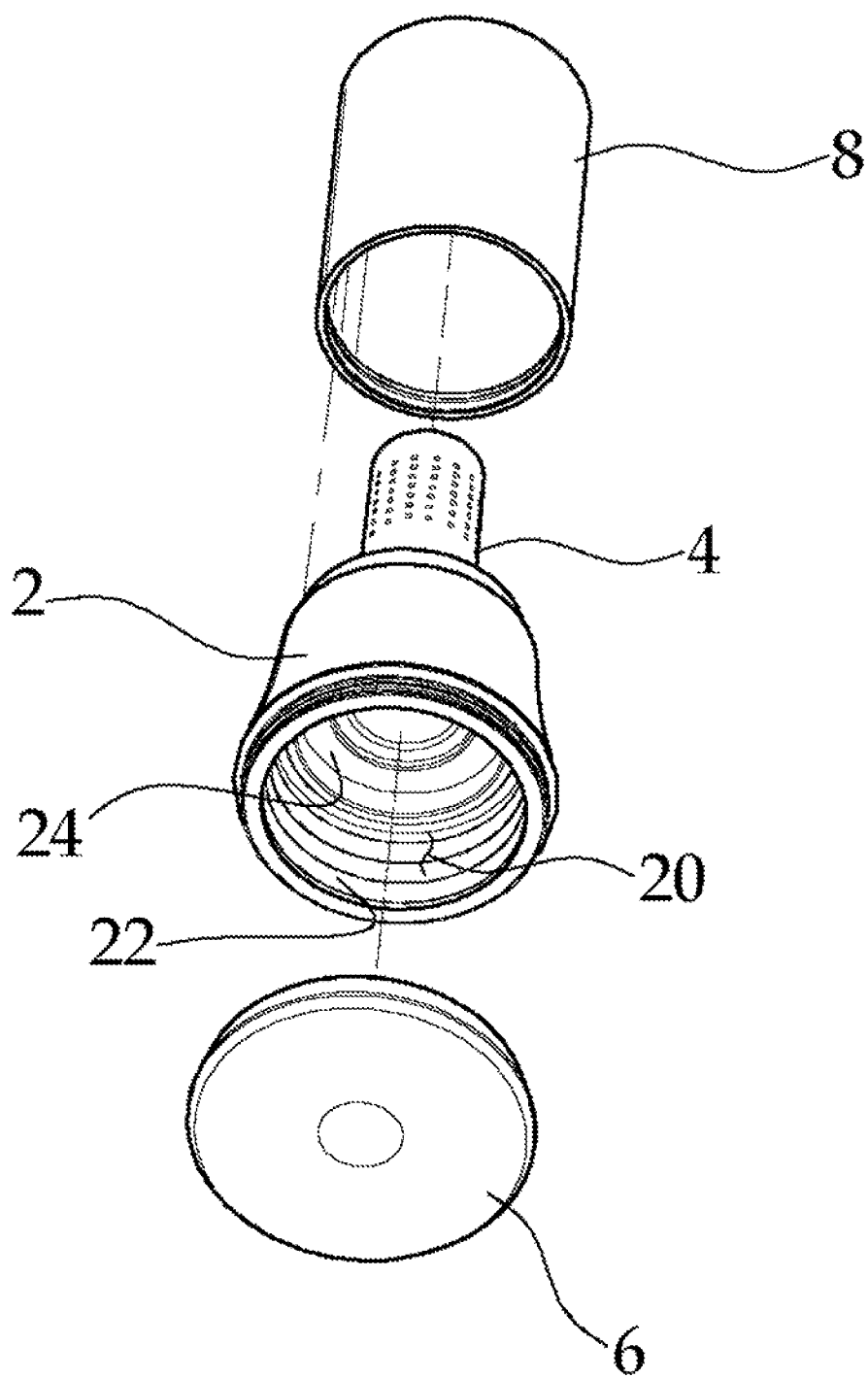
FIG. 3 is a perspective view illustrating a tea infuser viewed from the bottom, according to an embodiment of the present invention.
Figure 4:
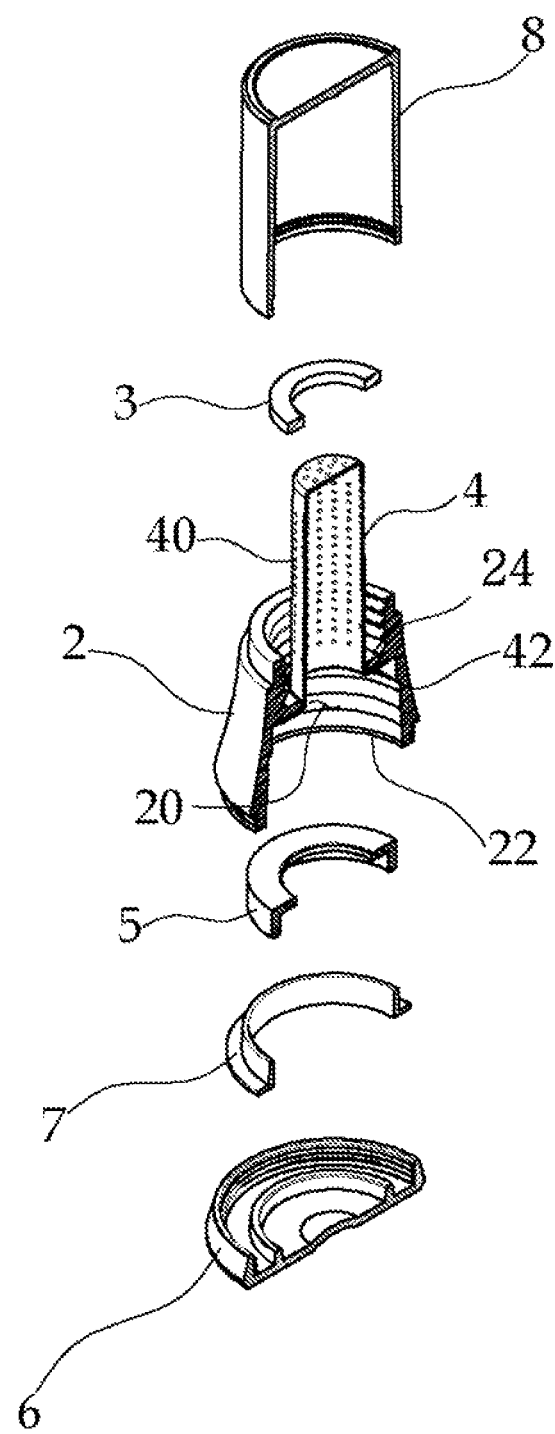
FIG. 4 is an exploded perspective view illustrating a cross section of a tea infuser according to an embodiment of the present invention.
Figure 5:
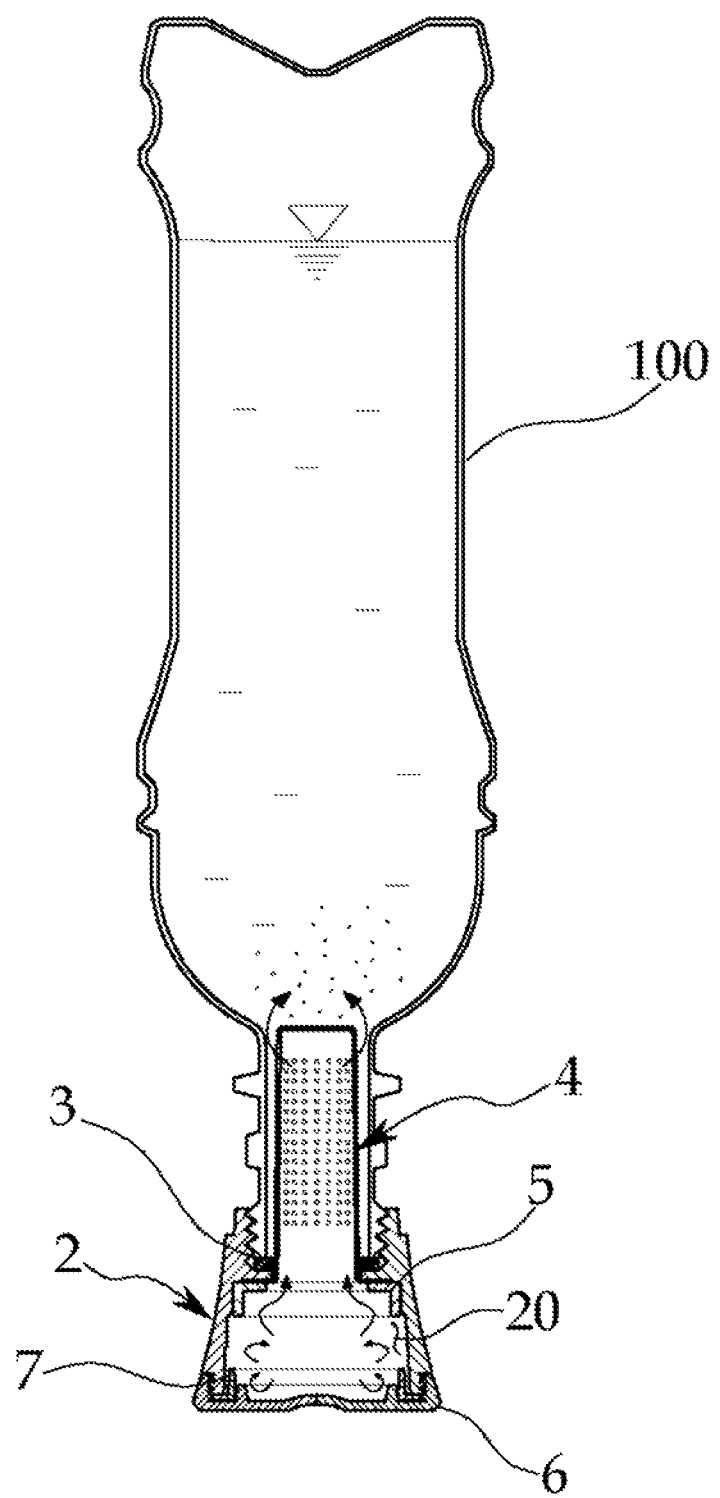
FIG. 5 is a cross-sectional view of a tea infuser for describing an example of use according to an embodiment of the present invention.

FIG. 1 is a perspective view illustrating a tea infuser according to an embodiment of the present invention. FIG. 2 is an exploded perspective view illustrating a tea infuser according to an embodiment of the present invention. FIG. 3 is a perspective view illustrating a tea infuser viewed from the bottom, according to an embodiment of the present invention. FIG. 4 is an exploded perspective view illustrating a cross section of a tea infuser according to an embodiment of the present invention. FIG. 5 is a cross-sectional view of a tea infuser for describing an example of use according to an embodiment of the present invention.

Referring to FIGS. 1 to 3, a tea infuser A includes a body 2, a filter 4 coupled with the body 2 inside the body 2 and containing a tea material, a lower cap 6 sealing a lower part of the body 2, and a cover 8 sealing an upper part of the body 2.

The body 2 is substantially shaped as a hollow truncated cone that widens in width from top to bottom. The body 2 has a first opening part 21 at an upper part thereof which allows for insertion and coupling of the neck of a predetermined bottle (e.g., a polyethylene terephthalate (PET) bottle—hereinafter, described with a PET bottle, as an example) 100. The first opening part 21 has an internal thread along its inner circumferential surface and is coupled with the externally threaded neck of the PET bottle 100.

The body 2 has an internal space 20 for containing, e.g., water.

A lower part of the body 2 has a second, opening part 22 with an external thread. The lower cap 6 may be threaded to the second opening part 22 to open or close the second opening part 22. As such, the lower cap 6 may be opened to put in or pull out the filter 4 from the body 2, facilitate to clean the inside of the body 2.

The body 2 is formed such that the first opening part 21 is smaller in size (e.g., area or volume) than the internal space 20. A ring-shaped upper jaw 24 is formed between the first opening part 21 and the top of the space 20 to fasten a lower part of the filter 4.

The filter 4 is inserted into the body 2 through the second opening part 22 of the body 2 and is projected upwards beyond the first opening part 21. The filter 4 is hollow and has multiple pores 40 in side and top surfaces thereof.

The filter 4 has an annular jaw 42 at a lower part thereof. The annular jaw 42 of the filter 4 is brought in tight contact with the upper jaw 24 in the internal space 20. The filter 4 may be formed of a substance (e.g., stainless steel) that may prevent pollution and damage or stop germs from spreading while aiding in cleaning. However, embodiments of the present invention are not limited thereto. For example, the filter 4 may be formed of ceramics or silicone or other substances.

The cover 8 is press-fitted into the body 2 through a coupling step 26 formed along an outer periphery of an upper part of the body 2. The cover 8 covers the filter 4 to block foreign substances from flowing in the filter 4. The cover 8 may be press-fittingly coupled or threaded to the body 2 for easier coupling and decoupling between the cover 8 and the body 2.

The lower cap 6 is coupled to the body 2 through the second opening part 22 to seal the body 2 and functions as a stand for supporting the tea infuser A. An anti-slip member or a sucking plate may be formed on an outer surface of the lower cap 6 for preventing a slip on, e.g., a table where the tea infuser A is placed.

An upper ring 3 is inserted inside the first opening part 21 to come in tight contact with the outer surface of the filter 4. The upper ring 3 is positioned opposite the annular jaw 42 of the filter 4 and pressingly supports the upper jaw 24 of the body 2 to fasten the filter 4. Upon coupling the PET bottle 100 to the tea infuser A, a tip of the neck of the PET bottle 100 needs to come in tight contact with the upper ring 3. The upper ring 3 may be formed of an elastic material, e.g., silicone, to provide an air-tightness coupling between the PET bottle 100 and the tea infuser A.

As such, the upper ring 3 firmly holds the upper part of the filler 4 to prevent the filter 4 from sliding down. Accordingly, the filter 4 may remain stationary with the annular jaw 42 tightly contacting the upper jaw 24 of the body 2.

A fixing member 5 may be formed for supporting the annular jaw 42 of the filter 4 to more securely fasten the filter 4.

The fixing member 5 is inserted and positioned in the internal space 20 of the body 2 to come in tight contact with an inner circumferential surface in the internal space 20. The fixing member 5 backs up the annular jaw 42 of the filter 4 from the bottom thereof to firmly fasten the filter 4. The fixing member 5 has a through-hole in the middle, through which the filter 4 passes through.

When the PET bottle 100 is coupled with the tea infuser A, the fixing member 5 may be pressed down by the weight of the PET bottle 100. The fixing member 5 may have a coupling part (not shown) that prevents the fixing member 5 from escaping while positioned in place. The upper ring 3, formed of, e.g., silicone, and the fixing member 5 may together cooperate to prevent water leaks from, the PET bottle 100 positioned upside down for tea infusion.

An O-shaped ring (simply referred to as an "O-ring") 7 is coupled with the lower cap 6 and tightly contacts the second opening part 22 of the body 2 to provide air tightness.

Now described is an example of the operation of the tea infuser A configured as described above.

The lower cap 6 is opened, and a tea material is put in. The term "tea material" as used herein may include, but not limited to, dried, finely cut tea leaves (e.g., chopped herbs) or a tea bag containing such tea leaves.

The lower cap 6 is closed and sealed, and the cover 8 is then opened.

Thereafter, the PET bottle 100 containing water is threaded into the body 2, with the body 2 positioned upside down, so that the filter 4 is inserted into the PET bottle 100 through the inside of the neck of the PET bottle 100.

After tightly coupling the PET bottle 100 with the body 2, the assembly (of the PET bottle 100 and the body 2) is turned around and placed on, e.g., a table, so that water may be introduced from the PET bottle 100 to the inside of the filter 4 and the body 2, and is then left for a predetermined time in that position to infuse tea.

When the PET bottle 100 is overturned, air filling the tea infuser A spreads up, naturally forming air bubbles to facilitate the tea infusion.

The body 2 of the tea infuser A is designed to have a large internal space to increase air pressure and to aid in air spreading, thus maximizing the flowability of air. The flow of air may accelerates the water flow in the PET bottle 100, thus leading to easier and quicker tea infusion.

According to an embodiment of the present invention, the tea infuser A may apply to various types of tea leaves or tea bags and allows for use in PET bottles that are commonplace.

According to an embodiment of the present invention, the tea infuser may be made in a compact or portable size and may be used together with a commonplace PET bottle, thus allowing for simplified tea making along with the recycling of the bottle.

Thus, the user may enjoy tea anytime, anywhere with the tea infuser and a PET bottle.

While the inventive concept has been shown and described with reference to exemplary embodiments thereof it will be apparent to those of ordinary skill in the art that various changes in form and detail may be made thereto without departing from the spirit and scope of the inventive concept as defined by the following claims.

What is claimed is:
1. A tea infuser, comprising:
a body widening downwards, the body including:
a first opening part at an upper side thereof, the first opening part having an opening for insertion and coupling of a neck of a bottle and having an internal thread along an inner circumferential surface thereof to allow the neck of the bottle to be threaded into the first opening part;

an internal space; and a second opening part at a lower side thereof, the second opening part having an external thread along an outer circumferential surface thereof;

a filter substantially shaped as a cylinder, the filter inserted and coupled with the body through the second opening part and projecting beyond the first opening part, the filter having a hollow in a middle thereof and multiple pores in side and top surfaces thereof;

a cover press-fitted into the body, stuck by a coupling step formed along an upper periphery of the body, and covering the filter to block inflow of foreign substances; and a lower cap coupled with the second opening part of the body to seal the second opening part and supporting the body, wherein a ring-shaped upper law is formed between the internal space and the first opening part of the body to fasten a lower part of the filter, wherein an annular jaw is formed on a lower part of the filter to tightly contact the upper jaw of the body, and, wherein a fixing member is inserted in the internal space of the body to tightly contact an inner circumferential surface of the internal space and supports the annular jaw of the filter, the fixing member having a through hole through which the filter passes.

2. The tea infuser of claim 1, wherein the first opening part is smaller in size than the internal space of the body.

3. The tea infuser of claim 1, wherein an upper ring is inserted in the first opening part to tightly contact an outer surface of the filter and is positioned opposite the annular jaw of the filter to pressingly support the upper jaw of the body and fasten the filter.

4. The tea infuser of claim 1, wherein an O-shaped ring is coupled to the lower cap and air-tightly contacts the second opening part of the body.

\* \* \* \* \*